United States Patent Office 3,354,135
Patented Nov. 21, 1967

3,354,135
PROCESS FOR THE STABILIZATION OF VINYL HALIDE POLYMERS BY TREATING IN THE PRESENCE OF HYDROFLUORIC ACID
Luciano Scarso, Milan, and Giorgio Boccato and Adelio Rigo, Venezia, Italy, assignors, by mesne assignments, to Montecatini Edison S.p.A., Milan, Italy
No Drawing. Filed Dec. 12, 1963, Ser. No. 330,011
Claims priority, application Italy, Dec. 22, 1962, 25,130/62
15 Claims. (Cl. 260—92.8)

ABSTRACT OF THE DISCLOSURE

Process for increasing the heat and light stability of vinyl polymers such as polyvinyl chloride, polyvinylidene chloride, polyvinylidene fluoride and polyvinyl fluoride or vinyl copolymers such as the copolymerization products of vinyl chloride, vinylidene chloride, vinyl fluoride and vinylidene fluoride, wherein the polymeric substance is treated at a temperature from $-15°$ C. to $+200°$ C. (preferably $+10°$ C. to $+110°$ C.) with an organic aromatic compound, i.e. monocyclic aromatic hydrocarbons, polycyclic aromatic hydrocarbons, phenols, aromatic carboxylic acids, aromatic aldehydes, aromatic ketones, aromatic halogen derivatives, aromatic sulphonic acids and aromatic nitro compounds, and hydrofluoric acid in the presence of 0.001 to 10% (by weight) of the hydrofluoric acid of a reaction promoter (e.g. water, methanol and other lower aliphatic acids, ethylether and hexamethyl acetone, the weight ratio of hydrofluoric acid and the aromatic compound being between 1:10 and 1:2, the weight ratio of the polymer and the aromatic compound being 1:50 to 1:2.

---

The present invention relates to a process for increasing the stability with respect to light and heat of halogenated vinyl and/or vinylidene polymers and/or copolymers.

It is known that vinyl chloride polymers and copolymers have a tendency to decompose to various degrees when exposed to the action of light and heat, with consequent degradation and discoloration of the polymer or copolymer accompanied by deterioration of the mechanical and aesthetic properties.

Many attempts have been made to overcome this inconvenience by adding, for instance, metal salts to the already formed polymer or copolymer. Although these methods do lead to improved stability to light and heat on the part of vinyl chloride polymers and copolymers, they are not fully satisfactory for large-scale industrial applications. For instance, when using these methods it is difficult to obtain intimate mixtures of the additive or additives with the polymer and in many cases the presence of additives has a deleterious effect on the properties of the finished product. Moreover, in many cases the action of the additives is only temporary and the stabilizing action disappears after prolonged exposure to light and heat.

It is also known that some chlorine atoms of the polyvinyl chloride chain can be replaced by treatment with aromatic and alkylaromatic compounds in the presence of $AlCl_3$, and other substances similarly active as catalysts of the Friedel-Crafts reaction, according to an ionic mechanism.

The use of aluminum trichloride, and of other substances such as $FeCl_3$, $SnCl_4$, $BF_3$ and $ZnCl_2$, which behave similarly has great disadvantages, particularly in the purification of polyvinyl chloride to eliminate residues of the catalysts. Moreover, these compounds cause the rupture of the macromolecular structure of the polymer and the formation of centers of high reactivity and thus greater instability of the macromolecule.

The present invention provides an improved process for the heat- and light-stabilization of halogenated vinyl and/or vinylidene polymers or copolymers.

The invention consists in a process for increasing the heat- and light-stability of halogenated vinyl and/or vinylidene polymers and/or copolymers, in which the polymers and/or copolymers are treated with an organic aromatic compound in the presence of hydrofluoric acid.

The reaction may be carried out in the liquid or gaseous phase.

More particularly, the halogenated vinyl and/or vinylidene polymer and/or copolymer may be suspended in the aromatic compound (possibly dissolved in a suitable solvent) with which it must react. The hydrofluoric acid preferably containing small quantities of a promoter, is then added and the reaction mass stirred and brought to a suitable temperature for the substitution reaction, to start and lasting for a period of time which depends on the reciprocal quality and quantity of the reactants (polymers and aromatic substance) and of the hydrofluoric acid used in the reaction. The polymer or copolymer is then separated from the reaction mixture by centrifugation. The hydrofluoric acid and the aromatic compound retained in the polymer are removed by washing with methanol, and the last traces are removed by drying under vacuum.

Alternatively, a mixture of vapor of the aromatic compound, along with gaseous hydrofluoric acid (i.e. hydrogen fluoride) containing the promoter, can be passed over the polymer to be stabilized using a temperature and pressure sufficient to ensure that the aromatic organic compound is completely in the gaseous state, for a period of time depending on the operating temperature, the nature and mutual proportions of the reactants, and on the amount of hydrofluoric acid used. The resulting polymer is freed from the impurities, consisting of hydrofluoric acid and unreacted organic compound, by drying under vacuum, or else by treating with methanol vapor and then drying under vacuum.

The polymers which can be stabilized by the process of the present invention are preferably halogenated vinyl or vinylidene polymers such as polyvinyl chloride, polyvinyl fluoride, polyvinylidene chloride, and polyvinylidene fluoride.

The copolymers which can be stabilized with the process of the present invention are products derived from the copolymerization of halogenated vinyl and vinylidene monomers such as vinyl chloride, vinyl fluoride, vinylidene chloride and vinylidene fluoride.

The process of the present invention can also be advantageously applied in the stabilization of copolymers such as vinyl acetate-vinyl chloride, and maleic acid derivatives-vinyl chloride copolymers.

The aromatic organic compounds which can be used as light and heat-stabilizers for halogenated vinyl and/or vinylidene polymers and copolymers according to the present invention, can be chosen from a large number of substances. Good results are obtained by using monocyclic and polycyclic aromatic hydrocarbons, phenols, aromatic amines, aromatic carboxylic acids, aromatic aldehydes and ketones, aromatic halogen derivatives, aromatic sulphonic acids, or aromatic nitrocompounds.

The best results are, however, obtained by using aromatic hydrocarbons of the benzene and naphthalene series and their derivatives substituted in the nucleus.

All these compounds can be used alone or in mixtures.

The hydrofluoric acid used as catalyst may contain up to 5% of water, and is advantageously used in the presence of promoters such as, water, methanol and other lower aliphatic alcohols, ethyl ether and hexamethylacetone in amounts varying from 0.001% to 10% by weight with respect to the hydrofluoric acid.

The weight ratio of hydrofluoric acid/aromatic compound can vary within wide limits. Advantageous results are obtained operating with weight ratios of HF/aromatic compound ranging from 1:10 to 1:2.

The ratio of the reactants can vary within a wide range. Particularly suitable results are obtained with weight ratios of polymer/aromatic compound ranging from 1:50 to 1:2.

The temperature at which the stabilization process may be carried out can vary from −15° C. to 200° C. Particularly favorable results are obtained, however, operating at a temperature from +10° C. to +110° C.

The time of contact of the reactants is not critical as it depends on various factors such as the mutual quality and quantity of the polymers and aromatic organic compounds on the quantity of hydrofluoric acid and of any promoter used, and on the temperature at which the process is carried out.

The following examples are given to illustrate the present invention, but are not intended to limit its scope over that set forth in the appended claims.

*Example 1*

25 g. of polyvinyl chloride were suspended in 50 ml. of benzene in a pressure-tight container made of material resistant to hydrofluoric acid. 1 ml. of ethanol and 25 ml. of anhydrous hydrofluoric acid were then added. The container was closed and heated to 35° C., the contents being stirred constantly. After 2 hrs. the reaction products were discharged and centrifuged. The resulting polymer still contained a small quantity of benzene and hydrofluoric acid. It was washed twice in a centrifuge with a total of 50 ml. of methanol. After drying under vacuum, the polymer obtained from this process was subjected to a heat-stability test. The quantity of hydrochloric acid which it developed on heating to 180° C. for 90 minutes in an atmosphere of nitrogen, was 39% less than that developed by the same polymer before treatment, under the same conditions.

*Example 2*

1 g. of polyvinyl chloride was allowed to react with 50 ml. of benzene, 25 ml. of anhydrous hydrofluoric acid and 1 ml. of methanol, in the same apparatus, according to the same method, and using the same temperature and reaction time as in Example 1. The polymer obtained from the reaction, after treatment identical to that described in said example, showed a hydrochloric acid development 40% lower than that shown before treatment.

*Example 3*

432 g. of polyvinyl chloride were suspended in 1200 ml. of benzene and 24 ml. of methanol and 600 ml. of anhydrous hydrofluoric acid were added. The reaction mixture was stirred at 35° C. for 2 hrs. in an apparatus similar to that utilized for Example 1. At the end of the treatment, the products obtained were centrifuged, the polymer washed in the centrifuge with methyl alcohol, and then dried under vacuum. The heat-stability test revealed that over 90 minutes at 180° C. in the presence of nitrogen the hydrochloric acid developed was 38% lower than that developed by the untreated polymer, under the same conditions.

*Example 4*

1 g. of polyvinyl chloride was suspended in 50 ml. of toluene, and 1 ml. of methanol was added, together with 25 ml. of anhydrous hydrofluoric acid. Using an apparatus similar to that used for Example 1, the mixture was allowed to react for 2 hrs. at 35° C., with continuous stirring. At the end of the reaction, the polymer was decanted from the liquid layers and then poured into approximately 30 ml. of methanol. It was filtered and then dried under vacuum. The heat-stability test, performed in an atmosphere of nitrogen, heating to 180° C. for 90 minutes, showed a development of hydrochloric acid in the treated polyvinyl chloride 43% lower than that shown by the starting polymer.

*Example 5*

1 g. of polyvinyl chloride was suspended in a solution of 10 g. of naphthalene in 40 ml. of benzene, and 1 ml. of methanol and 25 ml. of anhydrous hydrofluoric acid were then added. The reaction and the recovery of the polymer were performed as in Example 4. The polyvinyl chloride thus treated showed (under the conditions described in Example 4) a stability 43% greater (expressed as the lower development of hydrochloric acid) than that shown by the same substance before treatment.

*Example 6*

1 g. of polyvinyl chloride suspended in 42 ml. of benzene containing 8 g. of dissolved phenol, was allowed to react in the presence of 1 ml. of methanol and 25 ml. of anhydrous hydrofluoric acid, under the same conditions as Example 4. The polymer treated in this manner had a 44% decrease in the quantity of hydrochloric acid developing during the stability test.

*Example 7*

1 g. of polyvinyl chloride was suspended in 50 ml. of benzene 0.25 ml. of methanol and 5 ml. of anhydrous hydrofluoric acid were added. The reaction mixture was stirred for 1 hr. at 50° C. in an apparatus similar to that described in Example 1.

At the end of treatment, the products formed were centrifuged, the polymer was washed with alcohol, and then dried under vacuum.

The polymer thus treated, on undergoing a stability test, and being heated under the same conditions as in Example 1, showed the development of 51% less HCl compared with a polymer not treated by the process of the present invention.

*Example 8*

9 g. of polyvinyl chloride were suspended in 25 ml. of benzene and 0.5 ml. of methanol and 12.5 ml. of anhydrous hydrofluoric acid were added. The reaction mixture was kept at 65° C. for 30 minutes. At the end of the reaction, the polymer was centrifuged, washed with methanol and dried under vacuum.

The polymer thus treated and subjected to a stability test showed when heated under the same conditions given in Example 1, the development of 29% less HCl compared with a polymer not treated according to the process described in the present invention.

*Example 9*

25 g. of granular polyvinyl chloride were placed between two pierced plates of material resistant to HF, within a container of the same material. A current of vapor at 100° C., consisting of a mixture of hydrofluoric acid containing 4% of methanol by volume, and benzene in the proportion of $HF/C_6H_6 = 1:2$ by volume, was passed through these pierced plates between which the polyvinyl chloride in granular form has been placed.

After an hour of such treatment the polyvinyl chloride was freed from the traces of benzene and hydrofluoric acid by washing with methanol and then dried under vacuum.

The polymer thus purified was submitted to a heat-stability test. The quantity of hydrochloric acid developed on heating at 180° C. for 90 minutes in an atmosphere of nitrogen was 24% lower than that developed by the same polymer before treatment, under the same conditions.

*Example 10*

In an apparatus similar to that described in Example 9, 6 g. of granular polyvinylchloride were treated with a stream of benzene and hydrofluoric acid (both in amounts of 0.5 mol/hr.) at 85° C. for 20 minutes.

At the end of such treatment a stream of nitrogen was passed over the polymer for 6 minutes.

The polymer thus purified (ready for use), was submitted to a heat-stability test. The quantity of hydrochloric acid developed on heating at 180° C. for 90 minutes in an atmosphere of nitrogen was 18% lower than that one developed by the same polymer, before the treatment, under the same conditions.

*Example 11*

Example 10 was repeated except for the subsequent treatment of the stabilized polymer. In this case a stream of nitrogen for 2 minutes and a stream of methanol vapor for 4 minutes was passed over the polymer previously treated with the aromatic compound and hydrofluoric acid.

The polymer thus purified (ready for use), was submitted to a heat-stability test. The quantity of hydrochloric acid developed on heating at 180° C. for 90 minutes in an atmosphere of nitrogen was 20% lower than that developed by the same polymer, before treatment, under the same conditions.

We claim:
1. A process for increasing the heat and light stability of polymeric substances from the group of vinyl polymers and copolymers wherein said substances are treated with an organic aromatic compound in the presence of hydrofluoric acid and the treatment of the polymeric substance is carried out in the liquid phase with said polymeric substance suspended in the aromatic compound in the presence of the hydrofluoric acid, at a temperature varying from −15° C. to +200° C.

2. A process according to claim 1 wherein the temperature lies between 10° C. and 110° C.

3. A process for increasing the heat and light stability of polymeric substances from the group of vinyl polymers and copolymers wherein said substances are treated with an organic aromatic compound in the presence of hydrofluoric acid and the treatment of the polymeric substance is carried out in the vapor phase by passing over the polymeric substance a mixture of vapors of the organic aromatic compound and of hydrogen fluoride at a temperature and pressure such that the aromatic compound is maintained in the vapor phase.

4. A process according to claim 1 wherein the hydrofluoric acid contains a promoter selected from the group consisting of water, methanol and other lower aliphatic alcohols, ethyl-ether and hexamethyl acetone in an amount ranging from 0.001 to 10 parts by weight per 100 parts by weight of the hydrofluoric acid.

5. A process according to claim 1 wherein the weight ratio between hydrofluoric acid and the organic aromatic compound lies between 1:10 and 1:2.

6. A process according to claim 1 wherein the weight ratio between vinyl polymer and copolymer and aromatic compound lies between 1:50 and 1:2.

7. A process according to claim 3 wherein the hydrofluoric acid contains a promoter selected from the group consisting of water, methanol and other lower aliphatic alcohols, ethyl-ether and hexamethyl acetone, in an amount ranging from 0.001 to 10 parts by weight per 100 parts by weight of the hydrofluoric acid.

8. A process according to claim 3 wherein the weight ratio between hydrofluoric acid and the organic aromatic compound lies between 1:10 and 1:2 and the weight ratio between vinyl polymer or copolymer and aromatic compound lies between 1:50 and 1:2.

9. A process for increasing the heat stability and light stability of a polymeric substance selected from the group consisting of vinyl polymers and copolymers wherein said polymeric substance is treated at a temperature ranging between substantially −15° and +200° C. with an organic aromatic compound in the presence of hydrofluoric acid containing from 0.001 to 10% by weight with respect to the hydrofluoric acid of a promoter selected from the group consisting of water, lower aliphatic alcohols, ethyl-ether and hexamethyl acetone, the weight ratio between hydrofluoric acid and aromatic compound being comprised between 1:10 and 1:2 and the weight ratio between vinyl polymer or copolymer and the aromatic compound being comprised between 1:50 and 1:2.

10. The process defined in claim 8 wherein said temperature ranges between substantially 10° C. to 110° C., said polymeric substance is selected from the group which consists of polyvinyl chloride, polyvinylidene chloride, polyvinylidene fluoride, polyvinylfluoride, and copolymerization products of vinylchloride, vinylidene chloride, vinylfluoride and vinylidene fluoride, and the aromatic compound is selected from the group which consists of monocyclic aromatic hydrocarbons, polycyclic aromatic hydrocarbons, phenols, aromatic amines, aromatic carboxylic acids, aromatic aldehydes, aromatic ketones, aromatic halogen derivatives, aromatic sulphonic acids and aromatic nitrocompounds.

11. The process defined in claim 10 wherein the treatment of the vinyl polymer or copolymer is carried out in liquid phase with said polymeric substance suspended in the aromatic compound.

12. The process defined in claim 10 wherein the treatment of the vinyl polymer or copolymer is carried out in vapor phase by passing over the polymeric substance a mixture of vapors of the organic aromatic compound and of hydrofluoric acid at a temperature and pressure such that the aromatic compound is maintained in vapor phase.

13. The process defined in claim 10 wherein said vinyl polymer is polyvinyl chloride.

14. The process defined in claim 10 wherein said aromatic compound consists of an aromatic hydrocarbon of the benzene or naphthalene series or of a ring-substituted derivative thereof.

15. A process for increasing the heat stability and light stability of polyvinyl chloride wherein the polymer is treated wtih an aromatic hydrocarbon in the presence of hydrofluoric acid containing from 0.001 to 10% by weight of the hydrofluoric acid of methanol as promoter at a temperature of −15° C. to +200° C., the weight ratio of hydrofluoric acid and the aromatic hydrocarbon being between 1:10 and 1:2 and the weight ratio of the polymer to the aromatic hydrocarbon being between 1:50 and 1:2.

No references cited.

JOSEPH L. SCHOFER, *Primary Examiner.*

J. A. DONAHUE, *Assistant Examiner.*